United States Patent Office 2,739,979
Patented Mar. 27, 1956

2,739,979
PREPARATION OF BORIC ACID ESTERS

Raymond F. Barnes, Joliet, and Herbert Diamond and Paul R. Fields, Chicago, Ill., assignors to United States of America as represented by the United States Atomic Energy Commission No Drawing. Application July 27, 1953,
Serial No. 376,280

3 Claims. (Cl. 260—462)

This invention deals with the preparation of boric acid esters, and in particular with the preparation of trialkyl borates.

One of the most essential uses of trialkyl borates is in scintillation counters for measuring fast neutrons; in such counters the neutrons react with the $B^{10}$-isotope releasing one alpha-particle for each reacted neutron according to $B^{10}(n,\alpha)Li^7$. These scintillation counters require a boron material enriched in the $B^{10}$-isotope and of high boron density. Boron esters, and in particular trimethyl borate, have a high boron density. $B^{10}$-enriched boron materials available at present are boron trifluoride-complexes, such as boron trifluoride diethyl etherate.

It is an object of this invention to provide a process by which boric acid esters may be produced in a simple manner and in a high degree of purity.

It is another object of this invention to produce boric acid esters enriched in the $B^{10}$-isotope from the available $B^{10}$-enriched $BF_3$-complexes.

It has been found that by reacting boron trifluoride etherate and an alcoholic solution of alkali metal alkoxide a boric acid alkyl ester is formed. Alkali metal fluoride and alkyl ether are obtained as side products. The boric acid ester can be isolated from the by-products by fractional distillation.

In producing trimethyl borate, for instance, boron trifluoride diethyl etherate is mixed with a methanol solution of sodium methoxide and allowed to react. The reaction proceeds according to the following equation:

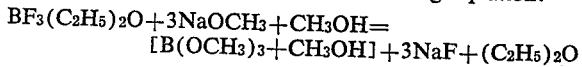

The brackets throughout the application are to indicate an azeotropic compound. The boiling point of the azeotrope of trimethyl borate and methanol is 54.6° C. Thus, by first distilling off the diethyl ether and thereafter the azeotrope, a good separation of the methyl borate-containing azeotrope can be accomplished.

For the recovery of the trialkyl borate from the azeotropic compound, many methods known to those skilled in the art may be used. The carbon disulfide method, for instance, was used satisfactorily. This method comprises the addition of carbon disulfide to the azeotrope whereby another azeotrope is preferentially formed with the alcohol and the trialkyl boric acid ester is released. This reaction, as applied to the production of the trimethyl boric acid ester, takes place according to the following equation:

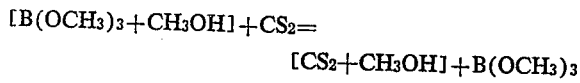

This newly formed azeotrope has a boiling point of 37.7° C., while any unreacted carbon disulfide distills off at 46.3° C. and the trimethyl boric acid ester boils at about 68.7° C. Thus, by distilling the newly formed azeotrope and the carbon disulfide off, a pure trimethyl borate can be obtained.

Instead of first separating the azeotrope between the boric acid ester and the alcohol, distillation after the first reaction may be restricted to the removal of the diethyl ether by merely heating to about 35° C. The remaining reaction mass, consisting of a mixture of the boric acid ester-alcohol azeotrope and sodium fluoride, may then directly be admixed with carbon disulfide whereby the first-formed azeotrope is decomposed and the preferential carbon disulfide-alcohol azeotrope is formed so that the reaction mass then contains sodium fluoride, trimethyl borate (boiling point 68.7° C.), excessive nonreacted carbon disulfide (46° C.) and the methanol-carbon disulfide azeotrope (38° C.). It is obvious that the various ingredients of this reaction mass can be easily separated by fractional distillation.

While any apparatus known to those skilled in the art may be used for the reaction and fractional distillation, a three-necked flask equipped with a Stedman fractionating column, a thermometer and a magnetic stirrer has been found particularly suitable. In each instance it was considered advantageous to heat and reflux the reaction mass in order to bring the reaction to completion after mixture of the ingredients for several hours.

Another method for separating the azeotrope comprises the admixture of concentrated sulfuric acid whereby two layers form, the upper layer containing the methyl borate with a small amount of methanol. Sulfuric acid treatment of the upper layer is advantageously repeated several times in order to remove the bulk of the small amount of methanol. Finally fractional distillation is carried out whereby the last traces of methanol are removed in the form of the azeotrope with trimethyl borate.

According to another very effective method, anhydrous lithium chloride is added to the azeotrope whereby two layers form, the lower layer mainly consisting of a methanol-solution of lithium chloride while the upper layer contains the bulk of the trimethyl borate of almost 100% purity. The methods of separating the trimethyl borate-methanol azeotrope are not part of the invention.

In the following, an example is given of the process of this invention for illustrative purposes.

Example

The equipment described above, comprising the three-necked flask and the Stedman fractionating column, was used for this experiment.

Nine moles of dry sodium methylate were slowly added to 36 moles of anhydrous methanol while the mixture was continuously stirred in order to prevent the formation of a hard cake by the partially dissolved sodium methylate. Three moles of borontrifluoride diethyl etherate were then dropwise added, also with stirring and while the reaction vessel was immersed in an ice bath. Any ether vapors rising in the Stedman column trapped and returned any boron trifluoride liberated by localized reaction heat. The ice bath was then replaced by a heating mantle and a head was fitted on the column which had a partial condensation-partial takeoff unit with an adjustable cold finger. The mixture was then refluxed for 25 hours. Thereafter the ether was distilled off at about 35° C. and then the temperature was raised to 55° C. whereby the methanol-methyl borate azeotrope was removed.

Concentrated sulfuric acid was then slowly added to the azeotrope in a quantity just sufficient to cause the formation of two layers. The upper layer, which contained the methyl borate and a small amount of methanol, was separated from the lower layer and treated again with sulfuric acid. This procedure was repeated three times for further removal of methanol. Thereafter the upper layer was distilled at 55° C. in order to volatilize the last traces of methanol in the form of the azeotrope. Finally, the pure methyl borate was distilled over at between 67.5 and 68.5° C. The various lower layers obtained in the sulfuric acid treatments were combined and distilled at 55° C. to remove the small quantities of methyl borate which had remained in the lower layer in the form of the azeotrope. The residue remaining after this distillation was discarded. The two fractions obtained by distillation of the lower and upper layers, respectively, at 55° C. were combined, treated with concentrated sulfuric acid and distilled as described above. The over-all yield after these various steps amounted to about 53%.

It will be understood that instead of trimethyl borate other alkyl esters of boric acid can be produced by the process of this invention. Thus, triethyl borate, tripropyl borate and tributyl borate, for instance, may be prepared by the process of this invention.

It will also be understood that this invention is not to be limited to the details given herein but that it may be modified within the scope of the appended claims.

What is claimed is:

1. A process of preparing trialkyl borate comprising mixing boron trifluoride diethyl etherate and an alcoholic solution of an alkali alkoxide in which the alkyl group has a maximum of four carbon atoms whereby trialkyl borate, alkali fluoride and alkyl ether are formed and separating said trialkyl borate from said fluoride and said ether.

2. A process of preparing trialkyl borate comprising mixing boron trifluoride diethyl etherate and an alcoholic solution of an alkali alkoxide in which the alkyl group has a maximum of four carbon atoms whereby trialkyl borate, alkali fluoride and alkyl ether are formed and fractionally distilling the mixture obtained for separation of the ingredients.

3. A process of preparing trimethyl borate comprising mixing boron trifluoride diethyl etherate and a methanol solution of alkali metal methoxide whereby trimethyl borate, alkali metal fluoride and diethyl ether are formed, distilling at about 35° C. whereby the ether is removed, distilling at about 55° C. whereby an azeotrope of methyl alcohol and trimethyl borate is removed, and separating the trimethyl borate from said azeotrope.

References Cited in the file of this patent

UNITED STATES PATENTS 2,543,511  Schlesinger _____ Feb. 27, 1951